March 16, 1965   P. K. TIEN   3,174,044
LIGHT FREQUENCY MODULATOR
Filed May 9, 1961   5 Sheets-Sheet 1

INVENTOR
P. K. TIEN
BY
ATTORNEY

March 16, 1965    P. K. TIEN    3,174,044
LIGHT FREQUENCY MODULATOR

Filed May 9, 1961    5 Sheets-Sheet 2

INVENTOR
P. K. TIEN
BY
ATTORNEY

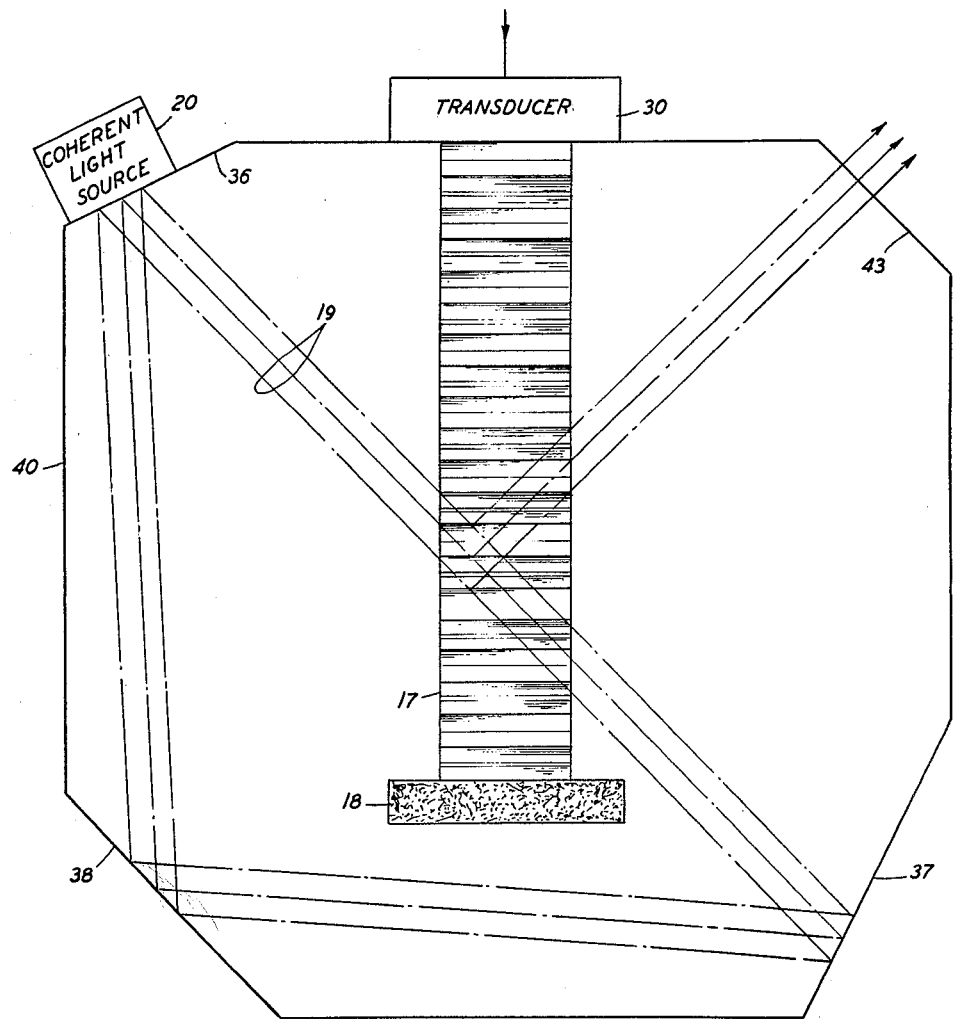

United States Patent Office 3,174,044
Patented Mar. 16, 1965

3,174,044
LIGHT FREQUENCY MODULATOR
Ping K. Tien, Chatham Township, Morris County, N.J., assignor to Bell Telephone Laboratories, Incorporated, New York, N.Y., a corporation of New York
Filed May 9, 1961, Ser. No. 108,787
3 Claims. (Cl. 250—199)

This invention relates to light modulators and more particularly to apparatus for modulating the frequency of coherent light waves.

Optical frequency electromagnetic radiation produced by devices such as the optical maser disclosed in United States Patent 2,929,922 to Schawlow and Townes is characterized by a high degree of monochromaticity and coherence. An optical maser for generating a continuous coherent beam of monochromatic light is described in copending United States patent application of A. Javan, Serial No. 816,276, filed May 27, 1959, now abandoned. As is well known, a beam of light waves having these properties may be modulated in accordance with signal information and is, therefore, useful in communications systems. Because of the extremely high frequency associated with wave energy in the optical portion of the electromagnetic spectrum, a beam of such light is capable of carrying enormous amounts of information. However, efficient utilization of this great potential is dependent on the availability of means for modulating wave energy at very high frequencies.

A number of methods of modulating the output of optical masers have been considered in the prior art. For example, the Schawlow and Townes maser, described in the above-cited patent, may be frequency-modulated by varying the magnetic bias field acting on the maser medium, thereby varying the separation between energy levels and, consequently, the frequency of the radiation associated with the electron spin transitions. This technique, however, characteristically involves the variation of rather large magnetic fields. As a result, although useful at lower frequencies, it is less advantageous at the very high modulation frequencies required for most efficient utilization of the information carrying capability of the coherent light beam produced by optical masers.

It is an object of this invention, therefore, to modulate the frequency of coherent light waves in accordance with very high frequency signal information.

It is a further object of this invention to modulate the frequency of the coherent light beam produced by an optical maser by means independent of the magnetic bias field of the maser.

These and other objects of the invention are achieved in one illustrative embodiment comprising a coherent light source and a transparent medium in which a hypersonic acoustic wave is produced. Advantageously, the acoustic wavelength is of the order of magnitude of the optical wavelength generated by the coherent light source. The coherent light beam is directed into the acoustically excited transparent medium at an angle oblique to the acoustic wave front and is reflected by the longitudinal variations in the refractive index of the medium produced by the acoustic wave. Such variations correspond to layers of alternately high and low density produced by the mechanical energy of the acoustic wave.

It has long been known that a column of acoustic waves in a transparent medium acts on light waves in a manner analogous to a column of layers of alternately high and low refractive index. Thus, light valves are known in which acoustic waves are excited in a transparent liquid and a beam of light is directed into the medium parallel to the acoustic wave fronts. In such devices a portion of the incident light is transmitted in a straight line through the medium, while another portion is diffracted at an angle to the acoustic wave. The relative amounts of the diffracted and undiffracted light depend on the intensity of the acoustic excitation. By modulating the acoustic wave and collecting one portion or the other, the intensity of the light beam is modulated.

It is also known that when a light beam is obliquely incident on a column of acoustic waves a portion of it is scattered or reflected at an angle which depends on the wavelength of the light and acoustic waves in the medium as well as on the angle of incidence. The angle, in fact, is given by the familiar Bragg relation, and the amount of light of given wavelength which is reflected by the acoustically excited medium falls off rapidly as the angle of incidence is varied from Bragg angle.

This invention is based upon the fact that the frequency of the light reflected by the acoustic wave differs from that of the incident light by an amount which depends upon the frequency of the acoustic wave.

It is a feature of this invention that the frequency of the reflected light rays is controlled by modulating the frequency of the acoustic wave.

It is another feature of the invention that the coherent light beam comprises rays which are incident to the acoustic wave front over an angular range, thereby achieving a wider modulation bandwidth than is achieved with a beam of parallel rays.

A further feature of the invention is an arrangement of reflecting surfaces for directing a beam of parallel coherent light rays over a patch which passes repeatedly through the transparent medium at different incident angles to the acoustic wave front therein. In accordance with this feature the modulation bandwidth is extended while more efficient use is made of the power contained in the coherent light beam.

The above-mentioned and other objects and features of the invention will be more readily understood from the following discussion, taken in conjunction with the accompanying drawings in which:

FIG. 5 shows another version of the invention adapted to conserve the power of the incident light beam.

Figure 1:
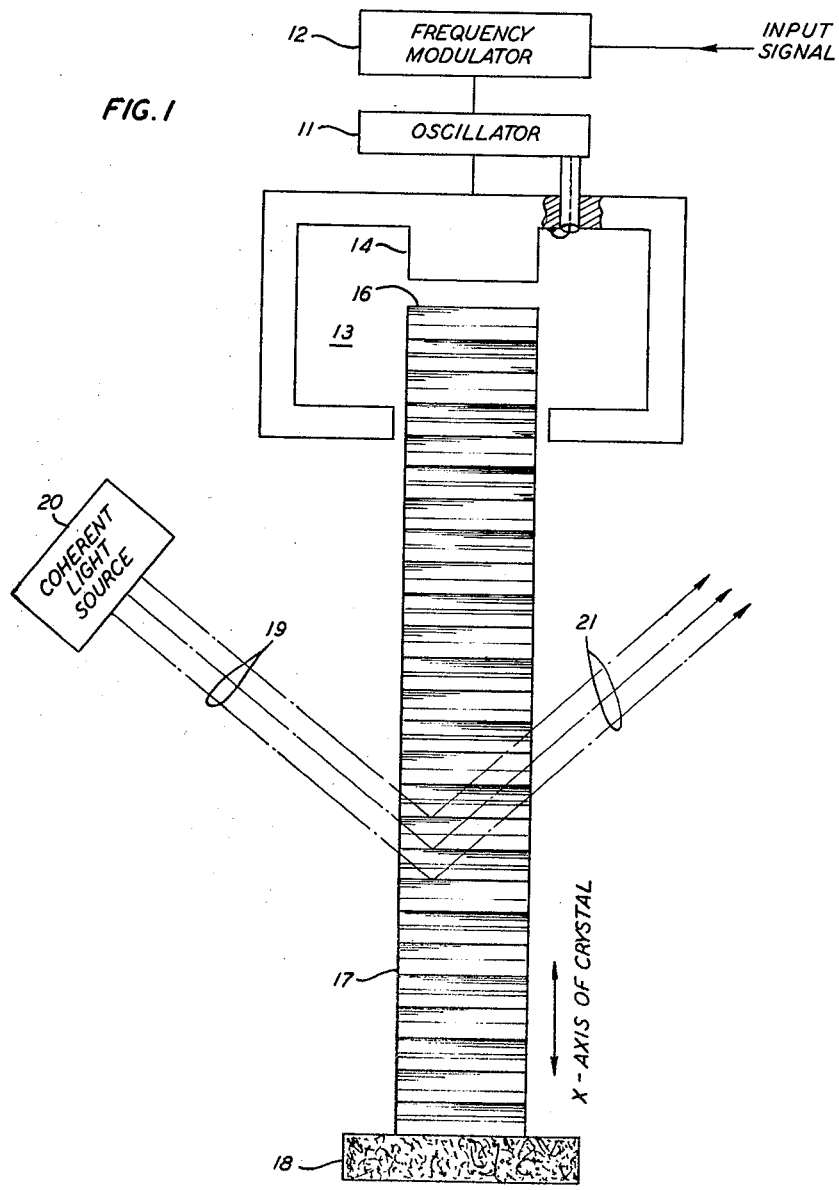
FIG. 1 illustrates schematically a basic arrangement embodying the principles of the invention.

In the illustrative embodiment shown in FIG. 1, input signal information is impressed on the output of an electromagnetic oscillator 11 by a frequency modulator 12. The modulated output, which typically will have a frequency in the microwave range, is then applied to a coaxial cavity resonator 13 having a center conductor 14. A piezoelectric rod 17, of quartz or other suitable acoustic wave propagating material, extends into the cavity 13. Advantageously, the crystalline axes of the rod 17 are oriented so that acoustic waves will travel down its length. In the example shown the X-axis of the quartz rod 17 coincides with the longitudinal dimension thereof. The portion of the rod 17 extending into the cavity 13 is terminated by an optically flat face 16 which is normal to the X-axis of the crystal and abuts the center conductor 14 of the cavity resonator 13. The end of the rod 17 removed from the cavity 13 is terminated by an acoustic absorber 18.

Microwave oscillations in the cavity 13 generate in the piezoelectric rod 17 a corresponding acoustic wave having a planar wave front which is propagated therealong and is dissipated in the absorber 18. The acoustic wave, of course, produces a sinusoidally varying density wave along the rod 17. The refractive index and the dielectric constant of the crystalline medium thus vary periodically in time and space in accordance with the density variations, a situation which corresponds to that which has been analyzed in wave-type parametric modulators. Thus, the acoustic medium may be considered as a distributed reactance varying sinusoidally in time and space. A detailed analysis of such a medium as a means of coupling two electromagnetic propagating circuits is given in my article "Parametric Amplification and Frequency Mixing in Propagating Circuits," Journal of Applied Physics, volume 29, pages 1347–1357 (1958), and consequently need not be repeated herein. Reference may be made to that article for a mathematical theory of the parametric interaction of light waves and acoustic waves in the present invention.

Figure 1A:
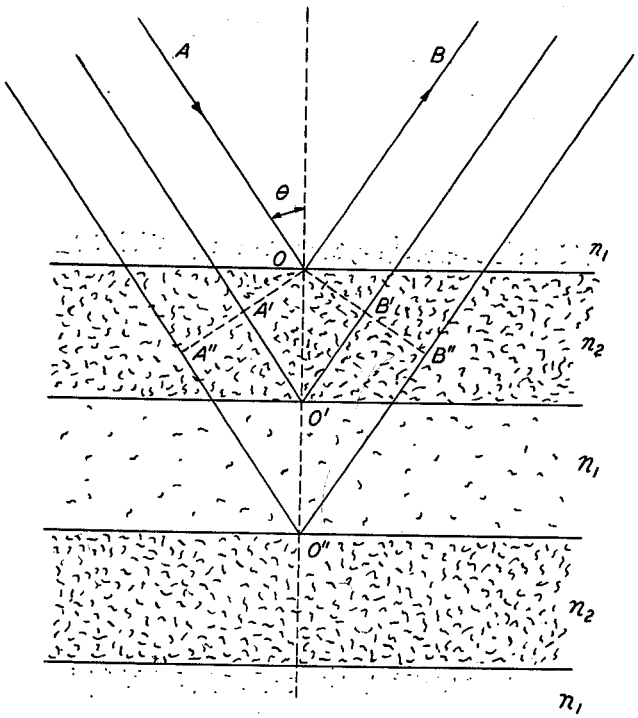
FIG. 1A illustrates in diagrammatic form the interaction between coherent light rays and a stratified dielectric medium.

When a beam of coherent light 19 from the source 20 is directed into the medium 17 at an angle to the acoustic wave fronts, it is reflected or scattered at the regions corresponding to the interfaces between the layers of high and low density. The effect is more easily understood by referring to FIG. 1A in which there is depicted a coherent beam of electromagnetic radiation directed obliquely into a stationary stratified dielectric medium, the strata or layers of the medium being characterized by refractive indices $n_1$ and $n_2$. It will be assumed for purposes of discussion that the beam is polarized in a direction normal to the plane of incidence. The distance O–O'' which spans one dense and one rare layer corresponds to an acoustic wavelength in a quartz medium, for example. The lines OA'' and OB'' represent the wave fronts of the incident and reflected light rays, respectively. Now the reflection coefficient for a wave striking an interface from medium $n_1$ to medium $n_2$ is equal to that for a wave striking an interface from medium $n_2$ to $n_1$, but the reflected waves are opposite in phase. Thus for in-phase addition of the reflected rays the path A'OB' must be a half light wavelength greater than the path A''OB''. This may be expressed by the well-known Bragg relation (1) $$n\lambda_1 = 2\lambda_s \cos \theta$$

in which $\lambda_1$ is the light wavelength, $\lambda_s$ is the acoustic wavelength, $n$ is the order of the diffracted wavelength under consideration, and $\theta$ is the angle of incidence. Table I gives examplary values of the Bragg angle $\theta$ for a light wave of frequency $10^{14}$ cycles/sec. and an acoustic wave in X-cut quartz having a frequency $f_s$.

*Table I*

| $\theta$ | $f_s$ (kmc.) |
|---|---|
| 70° | 1.91 |
| 60° | 2.80 |
| 50° | 3.58 |
| 40° | 4.26 |
| 30° | 4.86 |
| 20° | 5.25 |
| 10° | 5.55 |

Now when light is incident on the interfaces between high and low density layers in an acoustically excited medium the reflected wave has a frequency slightly different from that of the incident wave. According to the Doppler principle, (2) $$\omega_r = \omega_i \pm \frac{2V_s \cos \beta}{V_1}$$

where $\omega_r$ and $\omega_i$ are the angular frequencies of the incident and reflected waves, respectively, while $V_s$ and $V_1$ are the velocities of the acoustic and light waves. The minus sign in (2) is chosen when $V_s$ and $V_1$ have longitudinal components in the same direction; the plus sign is chosen when the longitudinal components are oppositely directed.

It follows from Equations 1 and 2 that (3) $$\omega_r = \omega_i \pm \omega_s$$

and (4) $$\beta_r = \beta_i \pm \beta_s$$

where $\beta$'s are the wave vectors or phase constants. Conditions 3 and 4 are those required in wave-type parametric modulators according to the theory described in the above-mentioned article. Condition 4 is exactly satisfied if the Bragg condition is derived to include the Doppler shift. Unfortunately, it appears that, when the incident rays depart from the condition expressed in Equation 1, $\omega_r$ as computed from Equation 3 does not agree with that computed from the Doppler principle in Equation 2. It can be shown, however, that the frequency of the reflected light is given more precisely by a complex relation involving the time-dependent function $e^{i(\omega_i + m\omega_s)t}$, $m = 1, 2, 3 \ldots$. The higher order terms are small and may be neglected when the departure from the Bragg condition is not large. The complex relation then reduces to (3). For present purposes it is sufficient, therefore, to consider Equation 3 as completely describing the relation between the incident and reflected light waves.

In the embodiment shown in FIG. 1 the frequency of the reflected beam is modulated by modulating the frequency of the acoustic wave produced in the rod 17. It is to be noted, however, that the modulation bandwidth achievable by this arrangement is limited. This is so because as the acoustic frequency deviates from that at which the Bragg relation is satisfied there is an increasing amount of destructive interference among light waves reflected from successive density layer interfaces. It may be shown that the bandwidth between half-power points of the light which may be reflected by a column of acoustic wave fronts is given approximately by (4a) $$2\frac{\Delta\omega_s}{\omega_s} = 0.885 \frac{1}{N}$$

where N is the number of acoustic wavelengths in the column.

Figure 2:
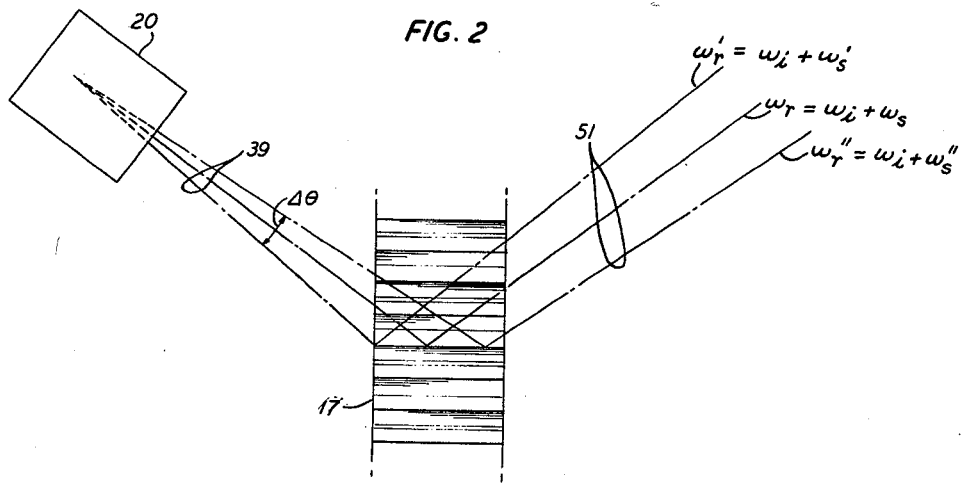
FIG. 2 depicts schematically a variation of the embodiment shown in FIG. 1.

FIG. 2 depicts an embodiment of the invention adapted to extend the frequency modulation bandwidth. In FIG. 2 the incident beam 39 is conical. Advantageously, the axes of the cone satisfies the Bragg relation. Instead of comprising parallel light rays which are all incident at the same angle as beam 19 in FIG. 1, the conical beam 39 comprises rays which are incident over an angular range $\Delta\theta$. As the acoustic frequency changes in accordance with signal information, the angle of incidence which meets the Bragg condition also changes. By including rays which are incident over an angular range it is assured that, within the limits defined, a portion of the beam 39 always meets the requirement and is reflected at maximum intensity. In this manner extraneous amplitude modulation of the reflected beam is reduced. While the conical beam 39 illustrated in FIG. 2 is divergent as it enters the medium, it is to be understood that a convergent beam is also suitable and may be employed if desired.

With the embodiment shown in FIG. 2 it is possible to modulate the coherent light beam over a very wide band. For example, if the range of incident angles $\theta$ encompassed by the beam 39 is from 30 degrees to 60 degrees and the center of the acoustic frequency band is 4 kilomegacycles, the reflected beam 51 may be modulated over a 2-kilomegacycle bandwith.

Although the embodiment of FIG. 2 permits wideband frequency modulation of light waves, it fails to make efficient use of the available power in the optical maser beam. This is so because only a relatively small portion of the incident light is incident at the Bragg angle while the rest is scattered or transmitted through the acoustic medium. A larger portion of the coherent light power may be modulated by the illustrative embodiment depicted in FIG. 3, in which a plurality of mirrors are arranged to reflect the beam of parallel rays repeatedly over a number of paths through the medium 17. Each ray path through the medium 17 makes a slightly different angle with the acoustic wave front. Thus at any given instant at least one ray path will be incident at or near the Bragg angle and will be reflected out of the mirror system to a utilization device.

Figure 3:
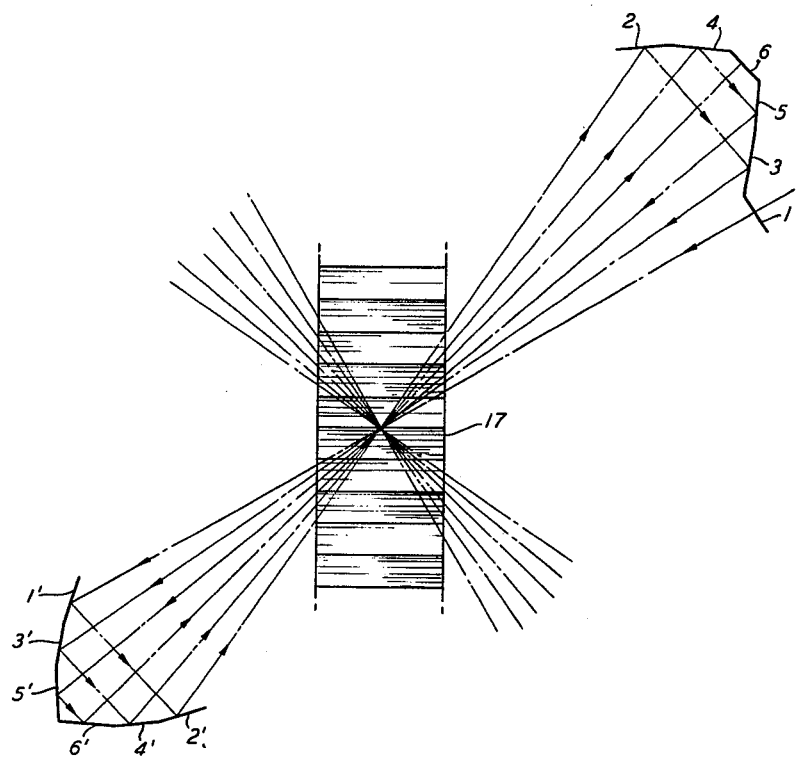
FIG. 3 is a schematic representation of an embodiment adapted for wideband frequency modulation.

In FIG. 3 the light beam to be modulated enters the system through a transparent or semi-transparent area of the mirror 1. Advantageously, the beam is normally incident to the mirror 1. In the absence of acoustic excitation of the medium 17, the beam traverses a path from mirror 1 to mirrors 1', 2', 2, 3, 3', 4', 4, 5, 5', 6' and 6 in succession. Mirror 6 is set normal to the beam reflected to it by mirror 6', so that the light retraces the path to mirror 1 where the process is begun again. When the acoustic wave is excited it has a frequency such that the Bragg angle lies in the angular range covered by the several ray paths through the medium 17. A portion of the light incident at or near the Bragg angle is reflected out of the mirror system by the acoustic wave front. The transmitted portion is reflected iteratively by the mirrors, an additional portion of it being modulated on each passage through the medium 17 at the proper angle.

Figure 4:
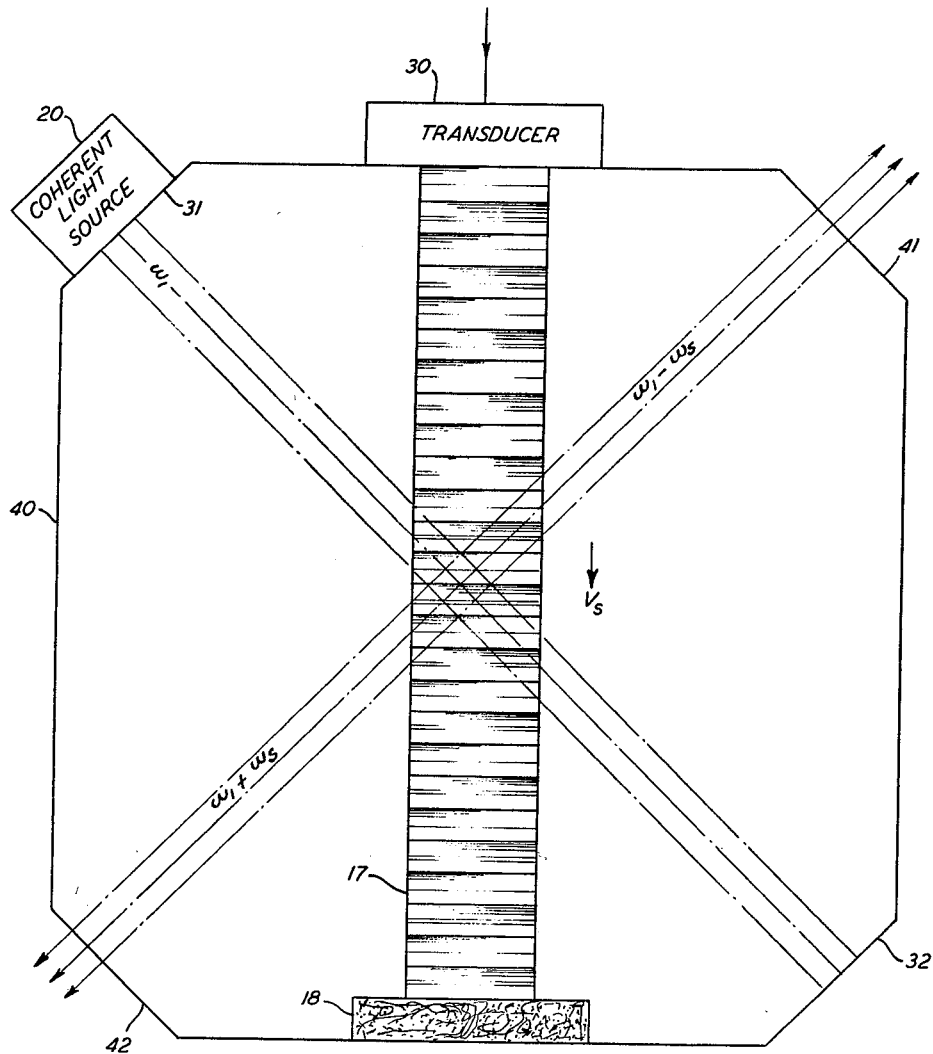
FIG. 4 depicts a variation of the invention for dividing the light beam into frequency channels.

It is to be noted that the rays passing through the medium 17 have velocity components in the same and opposite directions relative to the velocity of the acoustic wave. Thus two modulated light beams are produced, having frequencies $\omega_r = \omega_i \pm \omega_s$. If desired, an unmodulated acoustic wave may be used, thereby separating a monochromatic coherent light beam into two distinct frequency channels useful, for instance, in a heterodyne detection system. If the apparatus is to be used for channel separation, of course, the mirror system shown in FIG. 3 may be replaced by a simple arrangement of two planar reflecting surfaces as illustrated in FIG. 4. In order to avoid excessive losses due to reflections at the surfaces of a solid rod, the entire light ray path may be contained in a transparent medium 40 in which a narrow column 17 of acoustic wave is produced by transducer 30. Thus the source 20 is coupled directly to the medium 40, the coherent light passing through a transmissive portion of the reflective surface 31. Part of the beam is reflected by the acoustic column and emerges from the medium through a flat transmissive surface 41 which is, preferably, normal to the direction of light propagation. Light which passes through the column 17 is reflected by mirror 32, is partially reflected by column 17 and emerges through transmissive surface 42. In some situations, however, the second channel is not needed and it is desired to abstract as much power as possible in a single channel which may or may not be frequency-modulated. This result may be accomplished by the technique illustrated in FIG. 5, in which the transmitted portion of the light beam is redirected by reflective surfaces 37, 38 and 36 so that it is added to the input beam 19, which enters the system through a light transmitting portion of surface 36.

The modulation bandwidth realized by the invention is limited by the relatively small velocity of the acoustic wave in the transparent medium. The limitation may be understood by noticing that an acoustic frequency cannot be established in the reflecting column in less time than it takes the acoustic wave front to travel from one end thereof to the other. This may be expressed by $$\text{(5)} \qquad \Delta\omega_s = \frac{\omega_s}{N}$$

where N is the number of acoustic wavelengths in the effective reflecting column. A larger bandwidth may be achieved by making N small. This may be accomplished, for example, by using a larger angle of incidence, with a correspondingly higher coefficient of reflection at each reflecting interface. Alternatively, a higher intensity acoustic wave may be employed to increase the proportion of the light reflected by the first few interfaces encountered by the incident beam. Other possibilities including the use of a narrow acoustic column, will occur to those skilled in the art, but it should be noted that decreasing N results in a smaller amplitude of the modulated beam unless additional measures are introduced to make more efficient use of the incident light. Mirror systems such as those shown in FIGS. 3 and 5 may be used to conserve power as described above.

The amount of information which may be impressed on a frequency modulated light beam by apparatus in accordance with the invention depends on the product of the number of time slots into which the beam may be divided in a second and the number of frequency slots available within the modulation bandwidth. The number of time slots is given by $$\text{(6)} \qquad n_t = \frac{\omega_s}{2\pi N}$$

For an acoustic frequency of 4 kilomegacycles and $N=50$, $n_t$ is $8 \times 10^7$. The number of frequency slots $n_f$ is found by dividing the available bandwidth by the line width of the coherent light source. For a 1-megacycle line width $n_f = 71$, so that the beam can transmit about $5.7 \times 10^9$ bits per second. The information capacity is strongly dependent on the line width of the source. For example, if the line width were 1 kilocycle instead of 1 megacycle, the capacity would be $5.7 \times 10^{12}$ bits per second.

Thus it has been shown that, by means of apparatus embodying the invention, highly coherent and monochromatic light beams may be frequency-modulated in accordance with signal information to be transmitted. Very large amounts of information may be impressed on coherent light beams in this manner. In addition, the invention may be used to separate such a light beam into distinct frequency channels for various purposes. These objects are achieved without varying the magnetic bias field of the optical maser, or otherwise affecting the coherent light source in any way.

While a number of specific illustrative embodiments have been described in the specification, various modifications and adaptations may be made by those skilled in the art without departing from the spirit and scope of the invention. For example, the confocal optical cavity disclosed in copending patent application by G. D. Boyd, A. G. Fox and T. Li, Serial No. 61,205, filed October 7, 1960, now Patent No. 3,055,257, may advantageously be used in conjunction with the invention described herein. Furthermore, a plurality of acoustic frequencies may be used to shift the frequency of the coherent light beam into a plurality of channels for use in transmission or detection apparatus.

What is claimed is:

1. Light frequency modulating apparatus comprising a quartz member, a first surface on said member having a reflective portion and a transmissive portion, means for directing a beam of light to be modulated into said member through the transmissive portion of said first surface, a second reflective surface on said medium, said second surface being reflectingly disposed with respect to said beam so that the light is iteratively reflected between said first and second surfaces, means for producing a column of acoustic waves in said medium, said column intersecting said beam so that the light is obliquely incident on the acoustic wavefront, whereby light is reflected from said acoustic waves, at least one transmissive surface on said member, said transmissive surface being substantially normal to the light reflected from said acoustic waves, and means for modulating the frequency of said acoustic waves whereby the frequency of the light so reflected is modulated.

2. Apparatus for modulating the frequency of coherent monochromatic electromagnetic radiation in the optical frequency range comprising
a modulator medium substantially transparent to radiation in the frequency range of that to be modulated,
means for producing a column of longitudinal hypersonic acoustic waves of frequency $\omega_s$ in said medium,
means for directing a beam of coherent monochromatic radiation of frequency $\omega_l$ to be modulated into said column at an acute angle $\theta$ to the acoustic wavefront where $\theta$ is defined by the relation $$\theta = \cos^{-1}\left[\frac{\lambda_l}{2\lambda_s}\right]$$

in which $\lambda_l$ is the wavelength of the radiation to be modulated and $\lambda_s$ is the wavelength of the acoustic wave in the medium,
a portion of said beam being transmitted through said column and a portion being reflected at a frequency $\omega_r$ from the column of acoustic waves,
means for directing the transmitted portion of said light beam to reincidence on the acoustic wavefront at an acute angle thereto,
and means for modulating the frequency of the acoustic wave in accordance with signal input information,
a portion of the transmitted and redirected light being reflected from the acoustic wavefront and modulated in accordance with the signal information thereby increasing the total modulated portion of the light originally directed into the modulator medium,
the frequency $\omega_r$ of the reflected radiation being modulated in accordance with the relationship $\omega_r = \omega_l \pm \omega_s$, the minus sign being chosen when the acoustic waves and the incident beam of radiation have longitudinal velocity components in the same direction and the plus sign being chosen when the longitudinal velocity components are oppositely directed.

3. Apparatus for modulating the frequency of monochromatic coherent light comprising
a modulator medium substantially transparent to light in the frequency range of the light to be modulated,
means for producing longitudinal acoustic waves in a portion of said medium,
means for directing a substantially monochromatic and coherent light beam into said medium at an acute angle to the acoustic wavefront,
said beam being incident on, partially transmitted through and partially reflected from the wavefront,
means for modulating the frequency of said acoustic waves in accordance with input signal information,
the frequency of the beam portion reflected from the acoustic wavefront being modulated in accordance with the modulation of said acoustic waves,
means for directing the transmitted portion of said light beam to reincidence on the acoustic wavefront at an acute angle thereto,
a portion of the transmitted and redirected light being reflected from the acoustic wavefront and modulated in accordance with the signal information thereby increasing the total modulated portion of the light originally directed into the modulator medium,
and means for abstracting from said medium the coherent frequency modulated reflected portion of said light beam.

References Cited by the Examiner
UNITED STATES PATENTS 2,622,470   12/52   Rines _____ 88—61
3,055,258   9/62    Hurvitz _____ 88—14

OTHER REFERENCES

Willard, G. W.: Criteria for Normal and Abnormal Ultrasonic Light Diffraction Effects, The Journal of the Acoustical Society of America, vol. 21, No. 2, March 1949, pp. 101–108.

JEWELL H. PEDERSEN, *Primary Examiner.*

EMIL G. ANDERSON, *Examiner.*